INVENTOR.
E. C. MILLER
BY Hudson & Young
ATTORNEYS

June 10, 1958  E. C. MILLER  2,837,960
DIFFERENTIAL REFRACTOMETER
Filed May 9, 1955  2 Sheets-Sheet 2

INVENTOR.
E. C. MILLER

BY Hudson & Young

ATTORNEYS

United States Patent Office 2,837,960
Patented June 10, 1958

2,837,960

DIFFERENTIAL REFRACTOMETER

Elmer C. Miller, Bartlesville, Okla., assignor to Phillips Petroleum Company, a corporation of Delaware Application May 9, 1955, Serial No. 506,841

7 Claims. (Cl. 88—14)

This invention relates to measuring the refractive indices of fluid streams.

This application is a continuation-in-part of copending application Serial No. 314,464 filed October 13, 1952, now Patent No. 2,771,149, issued November 21, 1956.

In various chemical and petroleum processes it is common practice to analyze a sample stream removed from some point in the process and to adjust a variable in response to the analysis to maintain desired operating conditions. One particular system of analysis involves a measurement of the refractive index of a sample stream. The refractive index of a fluid stream is a function of composition thereof so that a continuous measurement of the refractive index of a fluid stream provides means for controlling a process in an automatic manner.

In accordance with the present invention there is provided an improved differential refractometer which is capable of measuring continuously the refractive index of a fluid stream. This measurement is made by comparing the refractive index of the fluid stream with the refractive index of a reference fluid. This is accomplished by directing a narrow beam of radiation through a refractometer cell and measuring the deviation of the emerging beam. The refractometer cell is provided with at least two adjacent compartments which are separated by a diagonal transparent plate. A reference fluid is positioned in one chamber and the sample stream is circulated continuously through the second chamber. The radiation beam emerging from the refractometer cell is directed through a rotatable flat plate of transparent material to the junction between first and second adjacent photocells. The output signals of the two photocells are compared by an electrical circuit which actuates suitable means to rotate the flat glass plate. The plate is rotated by an amount and in a direction so that predetermined quantities of radiation impinge upon the two photocells. The magnitude of rotation of the glass plate to restore this balanced condition is a measure of the deviation of the refractive index of the sample material from a predetermined value.

In accordance with one aspect of the invention a prism is disposed in front of the photocells so that the radiation beam incident upon the photocells strikes the apex of the prism. When the radiation beam is at an initial balance location, equal or other predetermined amounts of radiation are directed upon the two photocells. Any deviation of the radiation beam from this point results in a charge in ratio of the radiation directed upon the two photocells. The prism serves to magnify the deviation of the beam to provide a more sensitive instrument.

In accordance with still another aspect of the invention a second rotatable flat transparent plate is positioned in the radiation beam. The second plate can be adjusted manually to deviate the radiation beam a predetermined amount. This enables the instrument to measure deviations of refractive index of the test fluid over a greater range without reducing the sensitivity of the measurements. The second plate effectively provides a zero suppression on the recorder.

Accordingly, it is an object of this invention to provide improved apparatus for measuring the refractive index of a fluid stream.

Another object is to provide a differential refractometer having an improved optical system.

A further object is to provide a differential refractometer which automatically measures and records the refractive index of a fluid stream.

Other objects, advantages and features of the invention should become apparent from the following detailed description taken in conjunction with the accompanying drawing in which.

Figure 4A:
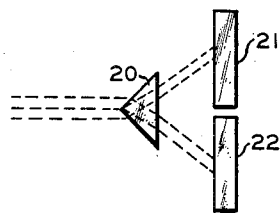
Figure 4B:
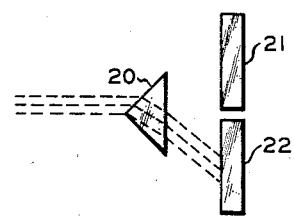
Figure 4C:
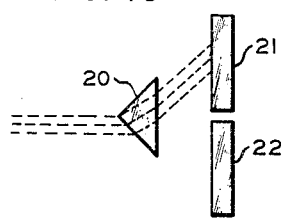
Figure 5:
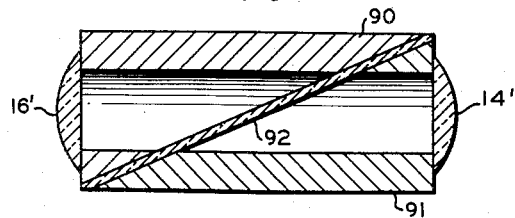

Figures 4a, 4b, and 4c are schematic representations of the operation of the prism disposed in front of the photocells; and Figure 5 is a schematic view of a second embodiment of the refractometer cell.

Figure 1:
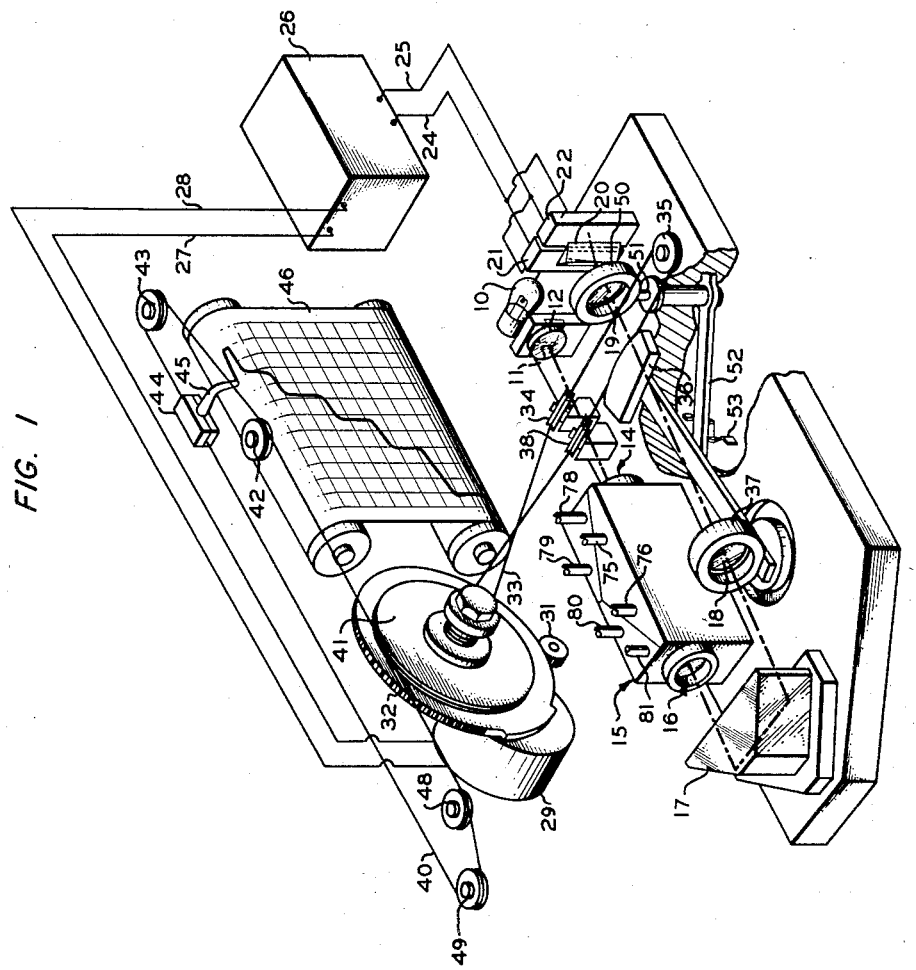
Figure 1 is a schematic view of the differential refractometer of this invention.

Referring now to the drawing in detail, and to Figure 1 in particular, there is shown a light source 10 which provides radiation in the visible spectrum. Radiation emitted from source 10 passes through a slit 11 and a converging lens 12. A housing, not shown, covers source 10 to prevent radiation from being emitted except through slit 11. Slit 11 serves as a virtual source for the analyzer and is located at the focal point of a collimating lens 14 so that a parallel beam of light passes through the refractometer cell assembly 15. The light emerging from cell assembly 15 passes through a converging lens 16 and enters the base of a reflecting prism 17. The beam is twice reflected within prism 17 and is directed therefrom through a first flat transparent plate 18, a second flat transparent plate 19 and a prism 20 to impinge upon first and second photovoltaic cells 21 and 22. Lens 12 acts as a condensing lens to increase the light reaching the photocells by focusing the filament of lamp 10 on lens 14. When the instrument is in a balanced position the light beam strikes the apex of prism 20 so that equal amounts of light impinge upon the two photocells 21 and 22. A deviation of the light beam to either side of the apex of prism 20 results in a greater amount of light impinging upon one of the photocells than upon the other.

Photocells 21 and 22 are connected in electrical opposition. The positive terminal of each photocell is connected to the negative terminal of the other. The positive terminals of the photocells are connected by respective leads 24 and 25 to the input terminals of a servo amplifier 26. The output terminals of amplifier 26 are connected by leads 27 and 28 to a reversible servomotor 29. A gear 31 is mounted on the drive shaft of motor 29 to rotate a second gear 32 in response to rotation of motor 29. A cord 33 is wound about the shaft which supports gear 32. Cord 33 extends about guides 34 and 35 and is in engagement with an arm 36 which is pivoted for rotation about a point beneath plate 18. Plate 18 is attached to arm 36 near the pivot point thereof by a lens mounting bracket 37. The second end of cord 33 extends about a guide 38 and engages arm 36. Rotation of motor 29 thus results in rotation of arm 36 about its pivot point which rotates flat plate 18. Rotation of flat plate 18 displaces the light beam to one side or the other.

A second cord 40 is wound about a disc 41 which is carried by the shaft of gear 32. The first end of cord 40 extends about guides 42 and 43 and is attached to a support 44 which positions a recording pen 45 on a chart 46. The second end of cord 40 is passed about guides 48 and 49 and is attached to support 44. Rotation of motor 29 thus moves recorder pen 45 on chart 44. Chart 46 is driven by a timing motor, not shown, to provide a continuous record of deviations of the refractive index of the sample stream being measured. Motor 29 can also actuate suitable control mechanism for automatic control purposes.

Plate 19 is attached by a lens mounting bracket 50 to a shaft 51 which is manually rotated by movement of an arm 52. Plate 19 can thus be rotated to one of several positions and retained in place by a bracket 53 which is in engagement with arm 52. Rotation of plate 19 further deflects the light.

Figure 2:
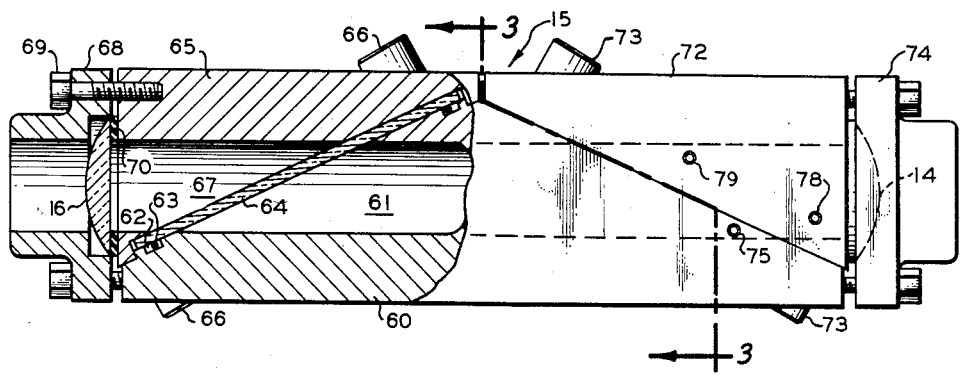
Figure 2 is a detailed view, shown partially in section, of a first embodiment of the refractometer cell.
Figure 3:
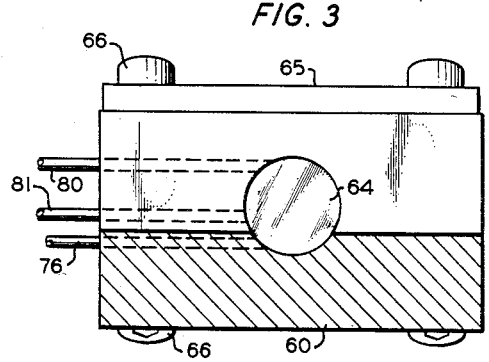
Figure 3 is a view taken along line 3—3 in Figure 2.

Refractometer cell assembly 15 is illustrated in detail in Figures 2 and 3. The cell assembly comprises a generally triangular shaped base block 60 having a passage 61 therethrough. An annular groove 62 is formed in the first side of block 60 to receive an annular sealing ring 63. A flat plate of transparent material 64 is positioned across this side of the block to cover groove 62. A second triangular shaped block 65 is attached to block 60 by screws 66. Block 65 has a passage 67 therethrough which forms an extension of passage 61. Passages 61 and 67 are thus separated by plate 64 when the two blocks are secured to one another. Lens 16 is positioned across the end of passage 67 and is secured in place by an annular cap 68 that is attached to blocks 65 and 60 by a plurality of screws 69. An annular gasket 70 is interposed between lens 16 and block 65 to form a fluid tight seal between the elements. A third block 72 is secured to block 60 by a plurality of screws 73. A second transparent plate, not shown, is positioned between these two blocks in the same manner that plate 64 is positioned between blocks 65 and 60. Lens 14 is positioned across the end of block 72 by a cap 74 which corresponds to cap 68.

First and second fluid passages are formed in block 60 to communicate with opposite ends of passage 61. Conduits 75 and 76, Figure 1, communicate with the outer ends of these passages. The fluid stream to be analyzed is introduced into passage 61 through conduit 75 and is withdrawn through conduit 76. By continuously circulating this sample stream through the cell, a continuous measurement of deviation of the refractive index thereof is provided. First and second passages are also formed in block 72 to communicate with the internal central passage therein. Conduits 78 and 79 communicate with the outer ends of these passages. Similar passages are also formed in block 65. Conduits 80 and 81 communicate with the outer ends of these latter passages. Passage 67 in block 65 and the corresponding passage in block 72 can be filled with a reference fluid, or a reference fluid can be circulated continuously through these two passages if desired. If the refractometer is employed to determine the refractive index of a gas stream, the two passages in blocks 65 and 72 can in some instances be opened to the atmosphere which provides the reference gas. When the refractometer is employed to determine the refractive index of a liquid stream, it may be necessary to equalize the temperatures and pressures of the reference liquid and the test liquid. This can be accomplished, for example, by the temperature and pressure equalizing means described in the application of E. C. Miller and B. J. Simmons, Serial No. 264,458, filed January 2, 1952.

Referring again to Figure 1, a narrow beam of radiation is transmitted through cell assembly 15 by lens 14. If the refractive index of the fluid in passage 61 is the same as the refractive index of the fluid in the passages in blocks 72 and 65 the light beam emerging from the cell assembly is undeviated. This beam is focused by lens 16 on the apex of prism 20. Plates 18 and 19 are positioned so that the parallel surfaces thereof are perpendicular to the light beam. Under this condition equal amounts of radiation impinge upon photocells 21 and 22. This is illustrated schematically in Figure 4a. The upper half of the incident light beam is refracted by prism 20 to impinge upon photocell 22. The lower half of the incident light beam is refracted to impinge upon photocell 21. As long as the light beam is centered on prism 20, equal amounts of radiation are directed to the two photocells. The output voltages developed by the two cells are equal so that there is a zero input signal applied to amplifier 26. The output signal from amplifier 26 is zero so that motor 29 remains stationary. If the refractive index of the fluid stream circulated through passage 61 should change in a first direction, the light beam directed through the cell assembly is deviated so that a greater portion of the incident light strikes the upper surface of prism 20, as illustrated in Figure 4b. As therein illustrated, all of the light impinges upon the upper surface of prism 20 so that all of the radiation is incident upon photocell 22. The output signal of photocell 22 is thus greater than the output signal of photocell 21 so that a signal of first phase is applied to amplifier 26. This rotates motor 29 in a direction to rotate plate 18 to deviate the light beam until it is again incident upon the apex of prism 20. The degree of motor rotation required to restore this balanced condition is indicated by the movement of recorder pin 45, which provides a measurement of the change in refractive index of the fluid stream circulated through passage 61.

If the refractive index of the fluid stream circulated through passage 61 should change in the opposite direction, the light beam emerging from passage 67 is deviated so that a greater portion of the light is incident upon the lower surface of prism 20, as illustrated in Figure 4c. This results in a signal of opposite phase being applied to amplifier 26 which causes rotation of motor 29 in the opposite direction to rotate plate 18 until the light beam is again incident upon the apex of prism 20. The servo system thus functions to center the light beam on the apex of prism 20 at all times. The motor rotation needed to accomplish this result is a measurement of the change in refractive index of the fluid stream circulated through the cell assembly. Obviously, the amplifier circuit can be adjusted so that an initial balance is obtained with any desired ratio of radiation impinging upon cells 21 and 22.

Manually rotatable plate 19 is provided to extend the range of the instrument without reducing its sensitivity. If the refractive index of the test fluid should change beyond the scale of chart 56, plate 19 can be rotated manually to deviate the light beam back toward the apex of prism 20 by a preselected amount. This effectively shifts the zero point on the recorder so that readings which normally would be off scale can be indicated on the same chart. Otherwise, it would be necessary to sacrifice the sensitvity of the recording system in order to accommodate a wider range of refractive index values.

Although prism 20 greatly increases the sensitivity of the instrument, it is not essential to satisfactory operation. In the absence of this prism the light beam is focused between the two photocells 21 and 22. At this focus point equal quantities of radiation impinge upon the two individual photocells. Prism 20, however, provides a more accurate splitting of the light beam and increases the sensitivity of the analyzer.

In Figure 5 there is shown a schematic representation of a second embodiment of the refractometer cell. This cell comprises first and second complementary blocks 90 and 91 which are separated by a transparent plate 92. A lens 14' is positioned across the opening on block 91 and a lens 16' is positioned across the opening on block 90. If there is a fairly large difference between the refractive index of the test fluid and the reference fluid, the single refraction provided at the junction between the two passages is all that is required. This is entirely satisfactory for many operations, particularly when measurements are made of liquids. The refractive indices of various gases are nearly alike, however, so that the dual refraction of the cell assembly of Figure 2 is preferred for such measurements.

While the invention has been described in conjunction with present preferred embodiments, it should be evident that the invention is not limited thereto.

What is claimed is:

1. An analyzer comprising a radiation source, radiation detecting means, means for passing a beam of radiation from said source to said detecting means, means in said beam for deflecting said beam in accordance with the refractive index of a test material, a first plate of radiation transparent material disposed in said beam of radiation, means responsive to said detecting means to rotate said first plate to deflect said beam of radiation so that said beam remains impinging upon a predetermined portion of said detecting means, means to indicate rotation of said first plate, a second plate of radiation transparent material disposed in said beam of radiation, and means to rotate said second plate to deflect said beam of radiation.

2. An analyzer comprising a radiation source, first and second radiation detecting means positioned adjacent one another, a radiation transparent prism positioned in front of and between said first and second detecting means so that a beam of radiation focused on the apex of said prism impinges equally on said first and second detecting means, means for passing a beam of radiation from said source toward said prism, means in said beam for deflecting said beam in accordance with the refractive index of a test material, a first plate of radiation transparent material disposed in said beam of radiation, means responsive to said detecting means to rotate said first plane to deflect said beam of radiation so that the radiation impinging upon said first and second detecting means remains in a predetermined ratio, means to indicate rotation of said first plate, a second plate of radiation transparent material disposed in said beam of radiation, and means to rotate said second plate to deflect said beam of radiation.

3. The combination in accordance with claim 2 wherein said first and second detecting means each comprises a photovoltaic cell; and wherein said means responsive to said detecting means comprises connecting the output voltages of said cells in opposition to provide a resultant voltage, a reversible motor, means energizing said motor in response to said resultant voltage, and means connected to the drive shaft of said motor to rotate said plate.

4. The combination in accordance with claim 2 wherein said means for deflecting said beam of radiation in accordance with the refractive index of a test material comprises first and second adjacent sample cells, means forming a radiation passage through said cells, and a second light transparent plate dividing said first and second cells, the plane of said second plate making an angle different from 90° with the longitudinal axis of said radiation passage.

5. The combination in accordance with claim 2 wherein said means for deflecting said beam of radiation in accordance with the refractive index of a test material comprises first, second and third adjacent sample cells, means forming a radiation passage through said cells, a second light transparent plate dividing said first and second cells, the plane of said second plate making an angle different from 90° with the longitudinal axis of said radiation passage, and a third light transparent plate dividing said second and third cells, the plane of said third plate making an angle different from 90° with the longitudinal axis of said radiation passage.

6. The combination in accordance with claim 2 wherein said plate is mounted on a rotatable base; and wherein said means to rotate said plate comprises a reversible motor, a cable, and means connecting said cable between said base and the drive shaft of said motor so that said base is rotated in a first direction when said motor rotates in a first direction and is rotated in a second direction when said motor rotates in a second direction.

7. An analyzer comprising a radiation source, first and second adjacent sample cells, means forming a radiation passage through said cells, a radiation transparent plate dividing said first and second cells, the plane of said plate making an angle different from 90° with the lonigtudinal axis of said radiation passage, first and second photovoltaic cells positioned adjacent one another, a radiation transparent prism positioned in front of and between said photovoltaic cells so that a beam of radiation focused on the apex of said prism impinges equally on said first and second photovoltaic cells, a first rotatable plate of radiation transparent material, means to direct a beam of radiation from said source through said first and second cells and said first plate toward said prism, means to establish an electrical signal representative of the difference between the outputs of said photovoltaic cells, a reversible motor, an arm attached to and extending from said first plate, a cable engaging the end of said arm remote from said first plate, means connecting the drive shaft of said motor to said cable so that rotation of said motor in a first direction rotates said first plate in a first direction and rotation of said motor in a second direction rotates said first plate in a second direction, means responsive to said electrical signal to energize said motor so that said motor rotates in a first direction when said signal is of a first polarity and in a second direction when said signal is of opposite polarity, a second rotatable plate of radiation transparent material positioned in said beam of radiation so that rotation of said second plate deflects said beam of radiation.

References Cited in the file of this patent

UNITED STATES PATENTS

| | | |
|---|---|---|
| 830,225 | Haber | Sept. 4, 1906 |
| 2,136,682 | Gilbert | Nov. 15, 1938 |
| 2,413,208 | Barnes | Dec. 24, 1946 |
| 2,445,044 | Stamm et al. | July 13, 1948 |
| 2,612,814 | Glasser | Oct. 7, 1952 |
| 2,624,014 | Barstow | Dec. 30, 1952 |

FOREIGN PATENTS

| | | |
|---|---|---|
| 819,732 | Germany | Nov. 5, 1951 |